Patented May 3, 1932

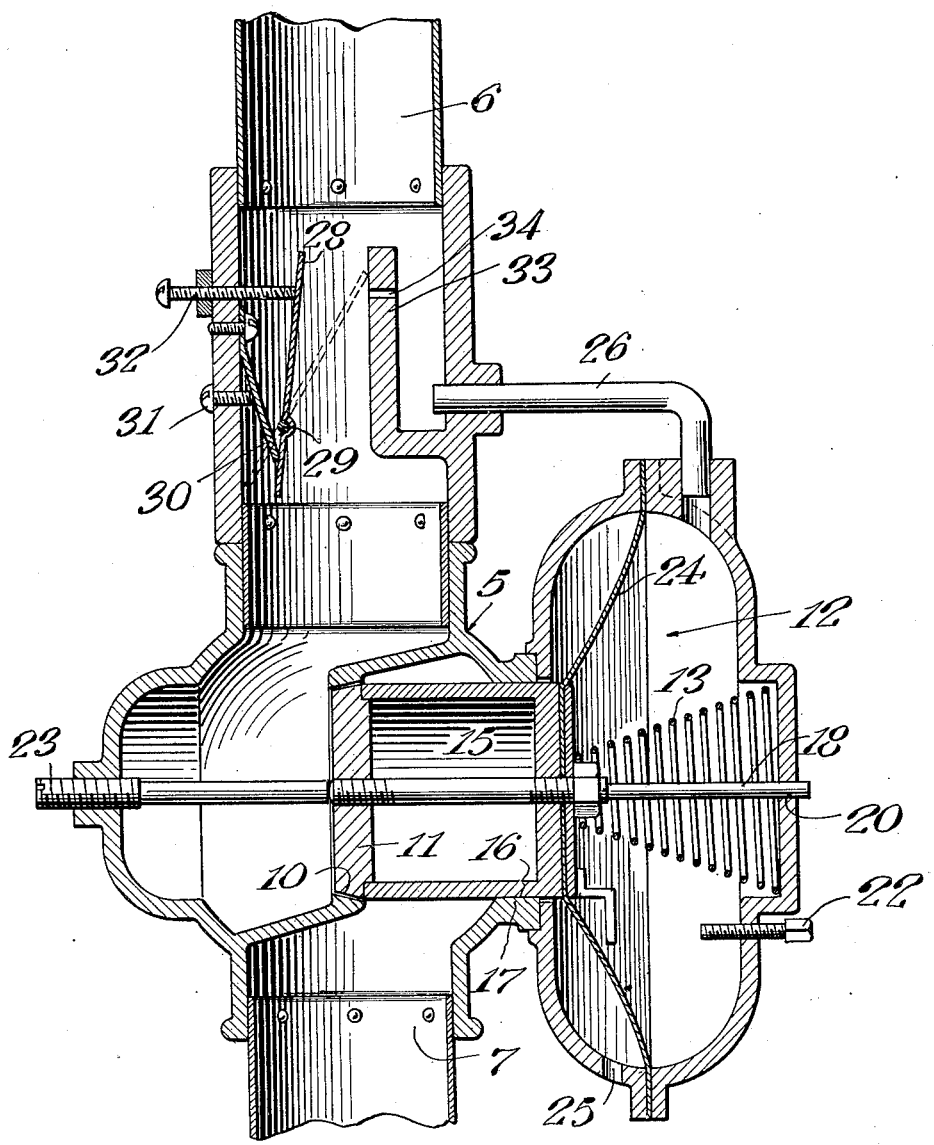

1,856,889

UNITED STATES PATENT OFFICE

JOSEPH JOHN STOETZEL, OF QUEENS VILLAGE, NEW YORK, ASSIGNOR TO G & G ATLAS SYSTEMS, INC., OF NEW YORK, N. Y., A CORPORATION OF NEW YORK

VALVE FOR PNEUMATIC DISPATCH SYSTEMS

Application filed December 31, 1929. Serial No. 417,630.

The present invention relates to pneumatic dispatch tube systems and has for an object to provide an improved air controlling and regulating device for a system of the minimum flow type.

It is desirable so to control the air flowing in the pneumatic tube line that when there is no carrier in the line a minimum flow of air will be maintained and when the line is loaded with one or more carriers an operative air current will be induced. To this end it is customary to provide a valve normally remaining closed to permit only a minimum flow with means operative upon the insertion of a carrier in the line to open the valve and means operative when the last carrier is discharged from the line to again close the valve. It is desirable that the arrangement for closing the valve should be extremely sensitive to discontinue the suction in the dispatch line as promptly as possible when the requirement for suction ceases in order that certain objectionable features may be avoided.

The nature and objects of the invention will be better understood from a description of a particular illustrative embodiment thereof, for the purposes of which description reference should be had to the accompanying drawing forming a part hereof and in which—

The figure is a central sectional view of a control mechanism embodying the invention.

The structure shown for the purposes of illustrating the invention comprises a control valve for a minimum flow pneumatic dispatch system designed, when the valve is substantially closed, to permit a minimum flow of air and, when the valve is open, to permit a carrier driving flow. As usual in control mechanisms of this type the arrangement is such that when a carrier is inserted in the line, the reduction of pressure in the line due to the suction will cause an opening of the control valve to cause a carrier driving flow of air and when the last carrier in the line is delivered and the line is free the valve will be again automatically closed.

Referring particularly to the structure shown in the drawing, the valve casing 5, arranged to be connected to a dispatch tube line 6 and a suction line 7 as is usual in control valves of this type, has a central port 10 closed by a valve member 11 which moves in the direction of the flow of air to open the port and in opposition to the flow of air to close it. The position of the valve member is controlled by a pneumatic 12 directly connected thereto, a spring 13 being arranged to apply a closing stress to the valve member at all times. The valve member may be of any suitable shape, but, as shown, comprises a cylindrical main portion 15 slidable through a port in the side wall of the casing as indicated at 16, a washer 17 being provided, if desired, to prevent leakage.

The cylindrical section 15 is shown as mounted on a valve stem 18 guided in the outer wall of the pneumatic as indicated at 20. The opening movement of the valve may be limited by stop screw 22 and its closing movement by a stop screw 23 projecting through the opposite side of the casing and adapted to abut against the valve member to determine the closed position thereof and therefore the extent of the minimum flow of air. The diaphragm 24 of the pneumatic 12 is subject on one side to atmospheric pressure through a port 25 and is subject on the other side to pressure within the dispatch line through a port 26. The valve is normally closed to provide only the minimum flow, but when a carrier is inserted in the dispatch line the air is exhausted in the dispatch line by virtue of the minimum flow, and, as the pressure is reduced, the pneumatic being subject to the reduced pressure through the port 26 causes the valve to be opened.

The arrangement for causing the closing of the valve when the carrier is discharged from the line or when a carrier is falling in a vertical section of the line, comprises an auxiliary valve arranged to be closed at least temporarily and remain closed until the closing of the main valve is accomplished. In the particular structure illustrated, the auxiliary valve consists of a butterfly valve member 28 pivoted at 29 and yieldably held in open position by a spring 30, the tension of which can be adjusted by means of a stop screw 31. The adjustable spring serves to hold the valve member in open position against the adjustable stop screw 32. In use the position of the butterfly valve is so adjusted by means of the stop screw 32 that it will be closed by the rapid current of air which occurs when a carrier is discharged from the line or passes the point at which the suction line is connected to the dispatch tube or when a carrier is dropping in a vertical section of the line.

As the valve member 28 closes against a suitable abutment such as indicated at 33, a vacuum or a partial vacuum is immediately formed in the valve casing and at the same time the in-rushing air, being momentarily stopped or deflected by the valve member 28, will pass through the port 26 and build up pressure against the outer face of the pneumatic diaphragm. The reduced pressure within the valve casing and the greater pressure on the outer face of the pnuematic diaphragm will quickly close the valve member. This arrangement of a main valve which is normally closed and is opened automatically by means responsive to the diminution of pressure in the dispatch line which occurs when a carrier is inserted in the line with an auxiliary valve which is normally open and is closed automatically when the current of air in the dispatch line reaches a predetermined velocity, provides a particularly effective and rapidly acting system. By this combination of two valves a desirable sensitiveness in the response to operating conditions is obtained.

A by-pass 34 for the valve member 28 is provided whereby the pressure on opposite sides may be equalized after the closing of the main valve member 11 in order that the butterfly valve member 28 may return to its open position. The leakage through the by-pass must, of course, be greater than that of the main valve when adjusted to its substantially closed position of a minimum flow.

The foregoing particular description is illustrative merely and is not intended as defining the limits of the invention.

What I claim is:

1. A control valve for a minimum flow pneumatic dispatch system comprising a valve casing adapted to be connected between a dispatch line and a suction line and having a port therebetween, a valve member controlling said port, means normally holding said valve from its seat to permit a minimum flow through said port, a pneumatic subject to the pressure within the dispatch line and operatively connected to said valve member, an auxiliary valve member arranged to stop the flow of air through the said port, and a by-pass permitting a greater flow than said minimum for equalizing the pressure on the two sides of said auxiliary valve when the latter is closed.

2. A control valve for a minimum flow pneumatic dispatch system comprising a valve casing adapted to be connected between a dispatch line and a suction line and having a port therebetween, a valve member controlling said port, a pneumatic subject to the pressure within the dispatch line and operatively connected to said valve member and a butterfly valve adapted to close off the connection between said casing and said dispatch line, said butterfly valve being spring pressed to open position, but subject to a rapid current of air to cause a closing thereof, arranged to stop flow of air through said port.

3. A control valve for a minimum flow pneumatic dispatch system comprising a valve casing adapted to be connected between a dispatch line and a suction line and having a port therebetween, a valve member controlling said port adapted to open in the direction of flow, a pneumatic subject to the pressure within the dispatch line and operatively connected to said valve member and an auxiliary valve automatically responsive to a rapid flow of air in the dispatch line to close said dispatch line to permit subsequent rapid closing of said port.

4. A control valve for a minimum flow pneumatic dispatch system comprising a valve casing adapted to be connected between a dispatch line and a suction line and having a port therebetween, a valve member controlling said port, a pneumatic operatively connected to said valve member, a restricted passage connecting said pneumatic and the dispatch line, and an auxiliary valve between said casing and said dispatch lines adjacent the inlet of said passage automatically operative upon the discharge of a carrier from the dispatch line temporarily to close the dispatch line.

5. A control valve for a minimum flow pneumatic dispatch system comprising a valve casing adapted to be connected between a dispatch line and a suction line and having a port therebetween, a valve member controlling said port, a pneumatic operatively connected to said valve member, a passage connecting said pneumatic and the dispatch line, an auxiliary valve between said port and said passage automatically operative upon the discharge of a carrier from the dispatch line temporarily to close the dispatch line and a by-pass for equalizing the pressure on opposite sides of said auxiliary valve.

In testimony whereof, I have signed my name to this specification this 16th day of December, 1929.

JOSEPH JOHN STOETZEL.